United States Patent
Chifor et al.

(10) Patent No.: US 12,155,674 B2
(45) Date of Patent: Nov. 26, 2024

(54) COVERT MONITORING OF AN ATTACKER HOST IN A SOFTWARE DEFINED PERIMETER NETWORK

(71) Applicant: LENOVO GLOBAL TECHNOLOGY (UNITED STATES) INC., Morrisville, NC (US)

(72) Inventors: Bogdan-Cosmin Chifor, Bucharest (RO); Radu Mihai Iorga, Bucharest (RO); Corneliu-Ilie Calciu, Bucharest (RO); Eduard Pavel, Bucharest (RO)

(73) Assignee: LENOVO GLOBAL TECHNOLOGY (UNITED STATES) INC., Morrisville, NC (US)

( * ) Notice: Subject to any disclaimer, the term of this patent is extended or adjusted under 35 U.S.C. 154(b) by 390 days.

(21) Appl. No.: 17/363,705

(22) Filed: Jun. 30, 2021

(65) Prior Publication Data
US 2023/0007015 A1    Jan. 5, 2023

(51) Int. Cl.
*H04L 9/40*    (2022.01)

(52) U.S. Cl.
CPC ...... *H04L 63/1416* (2013.01); *H04L 63/0428* (2013.01); *H04L 63/08* (2013.01)

(58) Field of Classification Search
CPC .. H04L 63/1416; H04L 63/0428; H04L 63/08
USPC .......................................................... 726/6
See application file for complete search history.

(56) References Cited

U.S. PATENT DOCUMENTS

| | | | | |
|---|---|---|---|---|
| 7,152,239 B1* | 12/2006 | Lyle | ..................... | H04L 63/1441 726/22 |
| 9,350,748 B1* | 5/2016 | McClintock | ........ | H04L 63/1491 |
| 11,483,339 B1* | 10/2022 | Kaimal | ............... | H04L 63/1416 |
| 2015/0154494 A1* | 6/2015 | Medvedovsky | ........ | H04L 43/04 706/46 |
| 2016/0381124 A1* | 12/2016 | Hwang | ............... | H04L 43/0817 709/226 |
| 2017/0149825 A1* | 5/2017 | Gukal | .................. | H04L 63/1491 |
| 2018/0109548 A1* | 4/2018 | Boss | .................... | H04L 63/1491 |
| 2020/0389437 A1* | 12/2020 | Miller | ................. | H04L 63/0236 |

OTHER PUBLICATIONS

Nec, "Automatic Cyber Defense Enabled By Software Defined Networking", URL: https://www.necam.com/docs/?id=758e7ed6-1b23-4ea3-b089-929246a60e82, accessed Dec. 2020, 4 pages.

* cited by examiner

*Primary Examiner* — Dant B Shaifer Harriman

(57) ABSTRACT

Covert monitoring of an attacker host in a software defined perimeter network, includes: authenticating, by an SDP controller, a first and second host in the SDP network, where the first and second host, after authentication, establish an end-to-end encryption communication session; detecting, by the SDP controller, that the first host is an attacker host and the second host is a victim host; establishing, by the SDP controller as a copy of the victim host, a mimic host; and redirecting, by the SDP controller, communication from the attacker host to the mimic host including migrating, without disruption detectable by the attacker host, the communication session from the victim host to the mimic host, where the mimic host monitors communications with the attacker host.

20 Claims, 3 Drawing Sheets

COVERT MONITORING OF AN ATTACKER HOST IN A SOFTWARE DEFINED PERIMETER NETWORK

BACKGROUND

Field of the Disclosure

The field of the disclosure is data processing, or, more specifically, methods, apparatus, and systems for covert monitoring of an attacker host in an SDP network.

Description of Related Art

As computer technologies become more interconnected, protecting against malicious software, such as malware, becomes more prevalent. There are various methods to protect against malicious software. In some instances, it is useful to protect a single system that is currently being attacked by isolating the system from an attacker. In some instances, it is useful to develop protection against future attacks similar to those used against the single system by gathering information about the attacker and the attacker's methods. Often, isolating a system from an attacker and gathering information about the attacker cannot be carried out in parallel. For both to be carried out together, communication between the attacker and the compromised system must not be interrupted in a manner in which the attacker is able to detect the interruption.

SUMMARY

Methods, apparatus, and products for covert monitoring of an attacker host in a software defined perimeter ('SDP') network according to various embodiments are disclosed in this specification. Such covert monitoring may include: authenticating, by an SDP controller, a first and second host in the SDP network, wherein the first and second host, after authentication, establish an end-to-end encryption communication session; detecting, by the SDP controller, that the first host is an attacker host and the second host is a victim host; establishing, by the SDP controller as a copy of the victim host, a mimic host; and redirecting, by the SDP controller, communication from the attacker host to the mimic host comprising migrating, without disruption detectable by the attacker host, the communication session from the victim host to the mimic host, wherein the mimic host monitors communications with the attacker host.

The foregoing and other objects, features, and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Exemplary methods, apparatus, and products for covert monitoring of an attacker host in a software defined perimeter ('SDP') network in accordance with the present disclosure are described with reference to the accompanying drawings, beginning with FIG. 1. A software defined perimeter is a framework configured to control access to resources based on identity of hosts in the network. The term 'host' as used in this specification generally refers to a computer or other system that is coupled for data communications with one other hosts or networks. A host may be implemented in a variety of manners according to embodiments of the present disclosure including, for example, a virtual machine, a container, or a physical computer system.

Hosts are authorized for data communications in an SDP framework based on identity. That is, connectivity in a software defined perimeter is based on a need-to-know model in which device (host) identity is verified before access to application infrastructure is granted. Application infrastructure is effectively invisible (that is, infrastructure cannot be detected), without visible DNS information or IP addresses. A network based on an SDP mitigates common network-based attacks, including, for example: server scanning, denial of service, SQL ('Structured Query Language') injection, operating system and application vulnerability exploits, man-in-the-middle, pass-the-hash, pass-the-ticket, and other attacks by unauthorized users.

Figure 1:
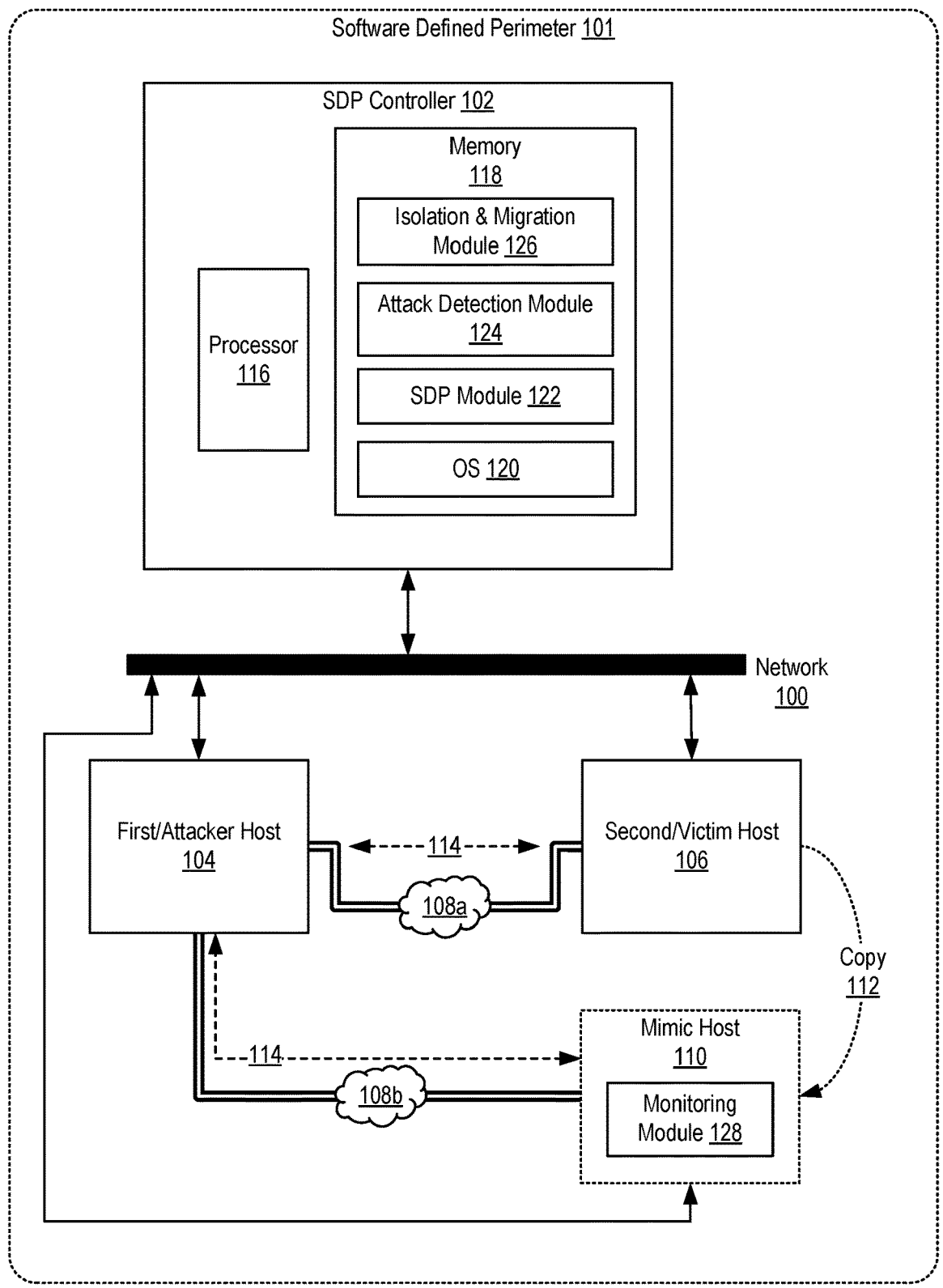
FIG. 1 shows a block diagram of an example host for covert monitoring of an attacker host in a SDP network according to some embodiments of the present disclosure.

For further explanation, therefore, FIG. 1 sets forth a block diagram of a software defined perimeter 101 that includes an SDP controller 102, a first host 104, and a second host 106. The SDP controller, first, and second host are coupled for communications through a data communications network 100. The SDP controller includes a processor 116 and memory 118. The processor 116 is configured to execute instructions stored in memory 118 of the SDP controller 102. The SDP controller 102 may also include other computer components, hardware, software, firmware, and the like not shown here.

Stored in memory 118 of the SDP controller is an operating system ('OS') 120 and an SDP module 122. The SDP module 122 is a module of computer program instructions configured for authenticating hosts within the SDP network and authorizing communication between the hosts based on identity. The SDP network includes accepting hosts that have previously authenticated with the SDP controller. When another host, referred to as an 'initiating host,' attempts to access resources within the SPD network, the SDP controller authenticates the initiating host and determines, based on the identity of the initiating host, which of the accepting hosts the initiating host is authorized to communicate with. The SDP controller then instructs the SDP accepting hosts authorized for communications with the initiating host to accept communication from the initiating host and vice versa. The initiating host may then initiate a communication session with one or more of the determined accepting hosts.

More specifically, in the example of FIG. 1, the SDP module 122 authenticates a first 104 and second 106 host in the SDP 101 network 100. The SDP controller 102 may then, based on the identity of the first and second host, authorize communication between the first and second host. Once the first and second host are authenticated and authorized to communicate with one another, the first and second host may establish a secure communication session, such as an end-to-end encryption communication session 108*a*. End-to-End encryption is a system of communication where generally only the communicating users can read the messages. Specifically, in the example of FIG. 1, the first and second host may utilize various cryptographic keys to encrypt and decrypt communications 114. Examples of end-to-end encryption protocols include Internet Protocol Security ('IPsec'), Transport Layer Security ('TLS'), Secure Shell ('SSH'), and the like.

Also stored in memory 118 is an attack detection module 124. The attack detection module 124 is a module of computer program instructions that, when executed by the processor 116, causes the SDP controller 102 to monitor data communications within the SDP network and analyze the data communications to detect malicious network traffic. Such malicious network traffic within the SDP network (that is, originating from an authorized host in the SDP network) may originate in a variety of manners including through malware. Such malware may include viruses, worms, Trojan horses, ransomware, spyware, adware, rogue software, wiper, and scareware among others. In some embodiments, the SDP controller executes the attack detection module 124 that monitors the data communications within SDP network and analyzes the data communications to detect malicious network traffic. In other embodiments, a third-party system may carry out such monitoring and analysis. In such embodiments, the third-party system may notify the SDP controller upon determining that data communications monitored within the SDP network include malicious network traffic. That is, the SDP controller in some embodiments, is said to 'detect' malicious network traffic or an 'attack' within the SDP network by receiving a notification from a third-party system of such malicious network traffic.

More specifically, in the example of FIG. 1, the attack detection module 124 detects that data communications 114 originating from the first host 104 and directed to the second host 106 include malicious network traffic. As such, the SDP controller determines that the first host 104 is an attacker host and the second host is a victim host.

Also stored in memory 118 of the SDP controller 102 is an isolation and migration module 126. The isolation and migration module 126 is a module of computer program instructions that, when executed by the processor 116, causes the SDP controller 102, to establish, as a copy of the victim host, a mimic host and redirect communication from the attacker host to the mimic host. The isolation and migration module 126 may establish a mimic host 110 in a variety of manners depending upon the implementation of the victim host. For example, in embodiments in which the victim host is implemented as a virtual machine ('VM'), the isolation and migration module 126 may instantiate a copy of the victim host VM including all data structures and state of the victim host VM.

The isolation and migration module 126 may also be configured to migrate, without disruption detectable by the attacker host, the communication session 108a from the victim host to the mimic host (depicted in FIG. 1 as 108b). Migrating the communication session 108a refers to instantiating a communication session 108b that appears, from the perspective of the attacker host, exactly the same as the communication sessions 108a between the attacker and victim host 106. In effect, the end point of the communication session is moved from the victim host 106 to the mimic host 110. Further, the migration is also described as being carried out "without disruption detectable by the attacker host" in that the attacker host is completely unaware that the migration has occurred. The migration of the communication session 108 from the victim to the mimic enables the victim host to be isolated from the attacker host 104.

Once the communication session 108b is migrated from the victim host 106 to the mimic host 110, the mimic host 110 may monitor, by the monitoring module 128, communications 114 with the attacker host. That is, the mimic host 110, covertly, without knowledge by the attacker host, gathers information about the attacker host while the attacker host believes it is communicating with the victim host. The mimic host 110 may report the gathered information to the SDP controller 102 or another system for further action.

Readers of skill in the art will recognize that the example SDP network of FIG. 1 may be implemented within or as part of a cloud computing environment. Such a cloud computing environment may be implemented as a private cloud computing environment, a public cloud computing environment, or a hybrid cloud computing environment. A private cloud is a cloud infrastructure that is operated solely for a single organization, whether managed internally or by a third party, and hosted either internally or externally. A public cloud comprises cloud resources that are owned and operated by a third-party cloud service provider and delivered over the public internet. Architecturally, there are few differences between public cloud and private cloud services, but security concerns increase substantially when cloud services, such as applications, storage, and other resources, are shared by multiple customers. A hybrid cloud is a composition of a public cloud and a private environment, such as a private cloud or on-premises resources, that remain distinct entities but are bound together, offering the benefits of multiple deployment models.

Although not depicted in detail in FIG. 1, readers of skill in the art will recognize that the first host, second host, and mimic host may all include computer hardware and software components, similar to those of the SDP controller 102. That is, any of the hosts may contain computer processors, memory, communication adapters, storage devices, video adapter, operating systems, applications, and so on. As mentioned above, in some embodiments, a host may be implemented as a virtual machine, a container, or other similar abstractions of hardware and software.

Figure 2:
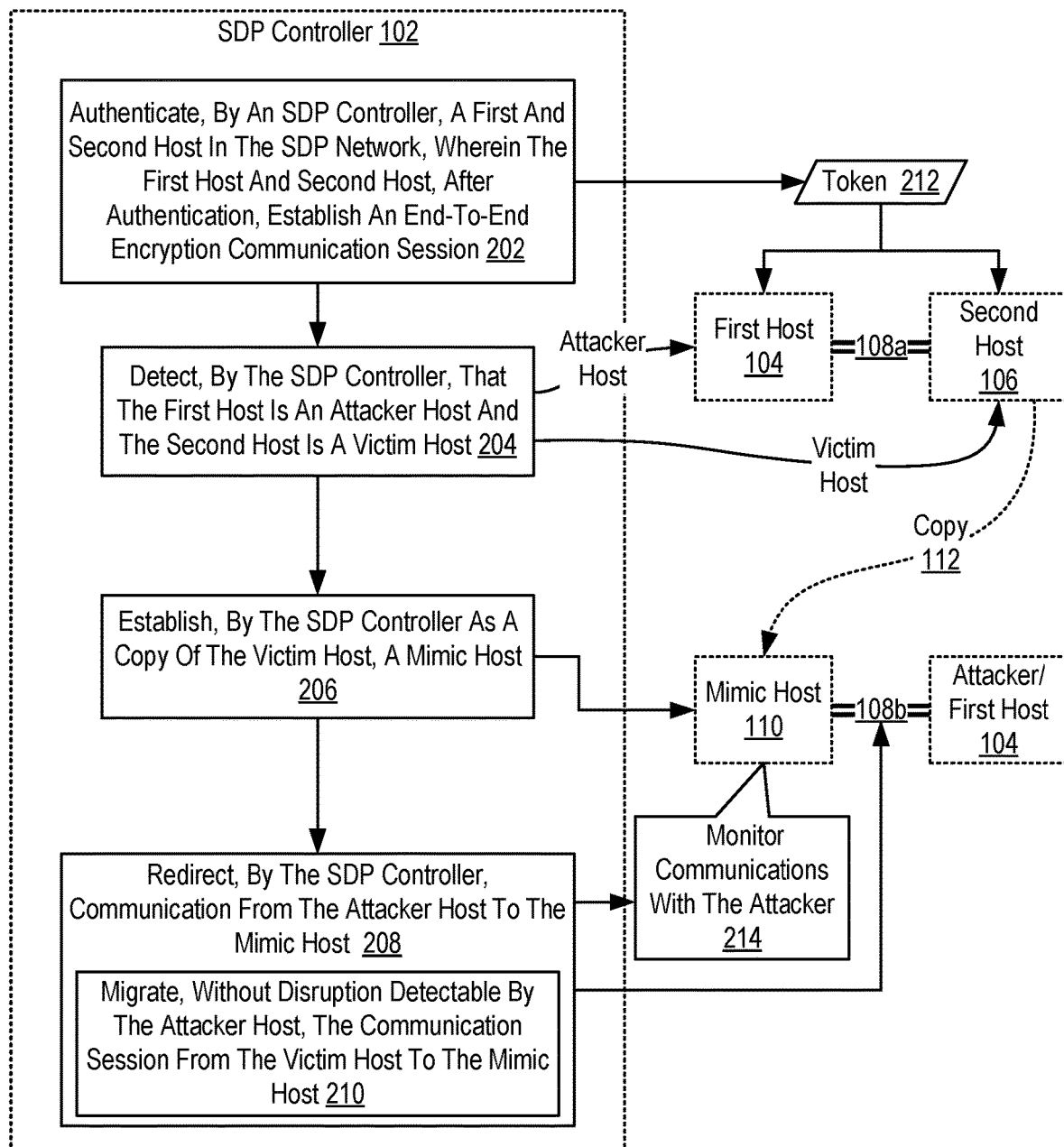
FIG. 2 is a flowchart of an example method for covert monitoring of an attacker host in a SDP network according to some embodiments of the present disclosure.

For further explanation, FIG. 2 sets forth a flowchart illustrating an example method of covert monitoring of an attacker host in a software defined perimeter ('SDP') network according to embodiments of the present disclosure. The method of FIG. 2 includes authenticating 202, by an SDP controller 102, a first 104 and second 106 host in the SDP network 100. Authenticating 202 the first 104 and second 106 host in the SDP network 100 may be carried out by the SDP controller receiving and verifying identification information, via a token 212, from each of the first and second host. Readers of skill in the art will recognize that authenticating by the SDP controller may involve multiple levels of verification, such as user authentication, a device certificate to an active system health check, and others.

In the method of FIG. 2, the first 104 and second 106 host, after authentication, establish an end-to-end encryption communication session 108. Establishing an end-to-end encryption communication session 108 may be carried out by the first and second host establishing a secure communication session where generally only the communicating users can read the messages. Examples of end-to-end encryption protocols include Internet Protocol Security ('IPsec'), Transport Layer Security ('TLS'), Secure Shell ('SSH'), and the like.

The method of FIG. 2 also includes detecting 204, by the SDP controller 102, that the first host 104 is an attacker host 104 and the second host 106 is a victim host 106. Detecting 204 that the first host 104 is an attacker host 104 and the second host 106 is a victim host 106 may be carried out in a variety of ways, including, for example by monitoring the data communications 114 being sent via the end-to-end encryption communication session 108 and detecting that data communications 114 originating from the first host 104 and directed to the second host 106 include malicious network traffic. That is, in some embodiments, the SDP controller detects that the first host is 'attacking' the second host in that the first host is sending malicious network traffic to the second host.

The method of FIG. 2 also includes establishing 206, by the SDP controller 102 as a copy 112 of the victim host 106, a mimic host 110. Establishing 206 as a copy 112 of the victim host 106, a mimic host 110 may be carried out in a variety of manners depending upon the implementation of the victim host. For example, in embodiments in which the victim host is implemented as a virtual machine ('VM'), the SDP controller may instantiate a copy of the victim host VM including all data structures and state of the victim host VM. Similarly, in embodiments in which the victim host is implemented as a container, the SDP controller may instantiate a copy of the victim host container including all data structures and state of the victim host container.

The method of FIG. 2 also includes redirecting 208, by the SDP controller 102, communication 114 from the attacker host 104 to the mimic host 110. In the method of FIG. 2, redirecting 208 the communication from the attacker host to the mimic host includes migrating 210, without disruption detectable by the attacker host 104, the communication session 108 from the victim host 106 to the mimic host 110. Migrating 210 the communication session 108 from the victim host 106 to the mimic host 110 may be carried out by migrating session and connection metadata from the victim host to the mimic host. Such session and connection metadata could include network information identifying ports, IP addresses, mac address, communication buffers, and so on as will occur to readers of skill in the art. For example, the network adapter and its associated data structures may be mirrored from victim to mimic host.

The method of FIG. 2 also includes monitoring 214 by the mimic host 110 communications with the attacker host 104. Monitoring 214 communications with the attacker host 104 may be carried out by the mimic host covertly, without knowledge by the attacker host, gathering information about the attacker host while the attacker host believes it is communicating with the victim host. Examples of information gathered by the mimic host may include network traffic metadata, device information of the attacker host, IP and other network addresses of the attacker host, content of messages transmitted from the attacker host, target of requests by the attacker host, and so on. Further, in some embodiments, the mimic host may be configured to attempt to install an agent on the attacker host that tracks actions carried out on the attacker host such as user interaction with web browsers or other applications. The mimic host 110 may report the gathered information to the SDP controller 102 or another system for further action.

Figure 3:
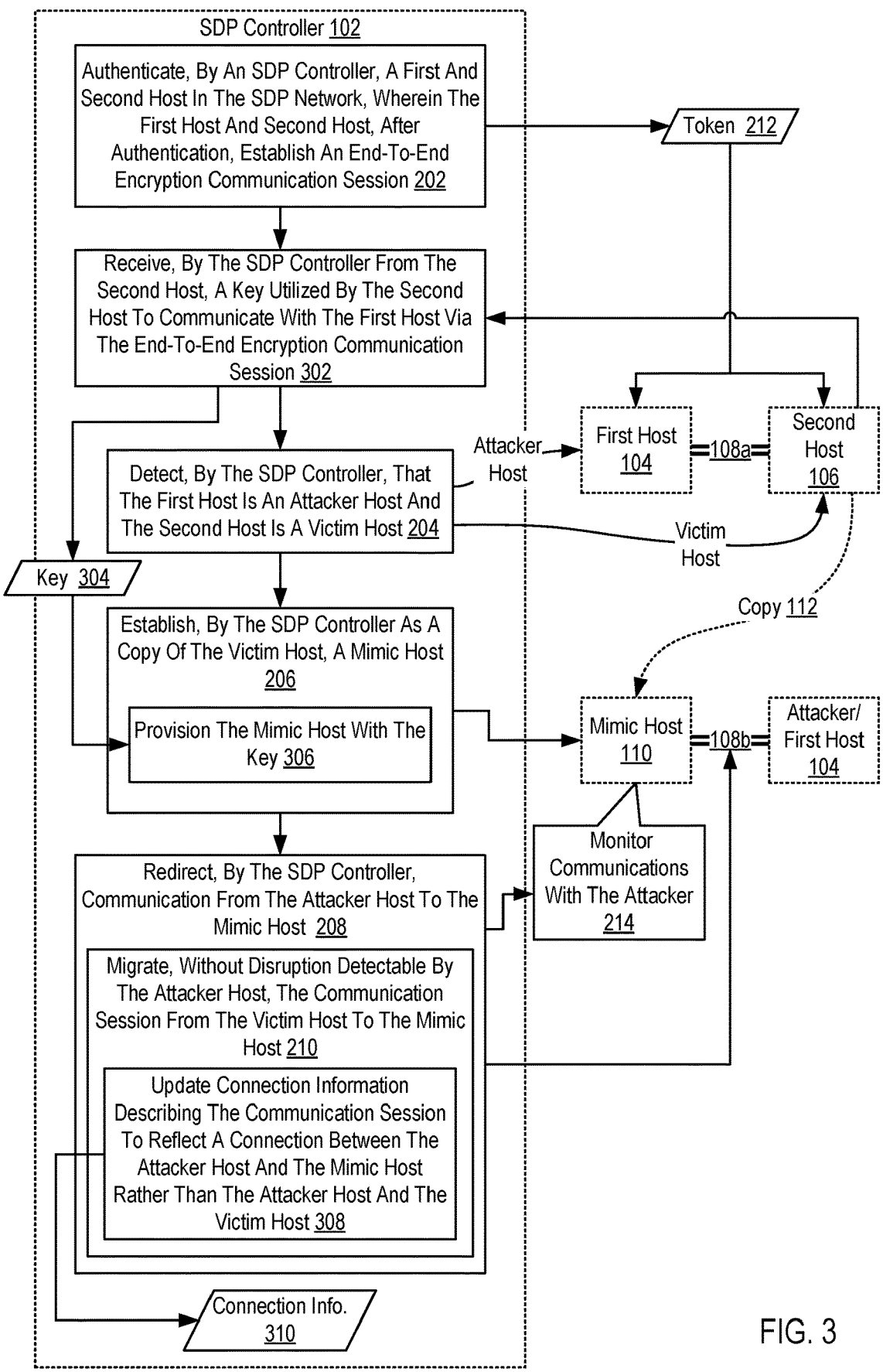
FIG. 3 is a flowchart of an example method for covert monitoring of an attacker host in a SDP network according to some embodiments of the present disclosure.

For further explanation, FIG. 3 sets forth a flowchart illustrating another example method of covert monitoring of an attacker host in an SDP network according to embodiments of the present disclosure. The method of FIG. 3 is similar to the method of FIG. 2 in that the method of FIG. 3 also includes: authenticating 202 a first 104 and second 106 host in the SDP network 100; detecting 204 that the first host 104 is an attacker host 104 and the second host 106 is a victim host 106; establishing 206 a mimic host 110; and redirecting 208 communication 114 from the attacker host 104 to the mimic host 110 including migrating 210, without disruption, the end-to-end encryption communication session 108.

The method of FIG. 3 differs from the method of FIG. 2, however, in that the method of FIG. 3 also includes receiving 302, by the SDP controller 102 from the second host 106, a key 304 utilized by the second host 106 to communicate with the first host 104 via the end-to-end encryption communication session 108. Receiving 302 the key 304 utilized by the second host 106 to communicate with the first host 104 via the end-to-end encryption communication session 108 may be carried out by receiving the key from the second host after the first and second host have established the end-to-end encryption communication session 108. The 'key' that the victim host shares with the SDP controller is, in some embodiments (such as asymmetric encryption), the victim host's private key. Readers of skill in the art will also recognize that the SDP controller may obtain the victim host's public key in a variety of manners. That is, in some embodiments, the end-to-end encryption communication session originally established between the first and second host (attacker and victim) relies on a pair of public and a pair of private keys. The private key of the victim host would normally not be shared with any other entity. However, in an effort to not disrupt the end-to-end communications session from the perspective of the attacker host, the victim host may share the private key with the SDP controller. The key 304 may be received by the SDP controller over a secure connection. The key 304 may be received by the SDP controller as part of or immediately following the establishment of the end-to-end encryption communication session 108. The key 304 may be received by the SDP controller asynchronously upon the detection of suspicious activity from the first host, or upon request by the SDP controller.

Also in the method of FIG. 3, establishing 206 the mimic host 110 includes provisioning 306 the mimic host 110 with the key 304. Provisioning 306 the mimic host 110 with the key 304 may be carried out by provisioning the mimic host 110 with the key 304 while instantiating a copy of the victim host. For example, in embodiments in which the victim host is implemented as a virtual machine ('VM'), the SDP controller may instantiate a copy of the victim host VM including all data structures and state of the victim host VM, as well as the key 304 from the victim host. In some embodiments the SDP controller may provision the mimic host 110 with both a private and a public key.

Also in the method of FIG. 3, migrating 210 the communication session 108 includes updating 308 connection information 310 describing the communication session 108 to reflect a connection between the attacker host 104 and the mimic host 110 rather than the attacker host 104 and the victim host 106. Updating 308 connection information 310 may be carried out by reassigning/updating the mappings of connection information associated with the victim host, such as a mac address, IP address, ports, and the like, to instead be associated with the established mimic host. In such embodiments, reassigning such connection information effectively isolates the victim host from the attacker host while also migrating the communication session 108 from the victim host to the mimic host.

In view of the explanations set forth above, readers will recognize that the benefits of covert monitoring of an attacker host in a software defined perimeter ('SDP') network according to embodiments of the present disclosure include:

Improving the security of public and private cloud platforms by gathering information about the activity of an attacked host within an SDP network; and Improved methods for gathering information about an attacker host within an SDP network by automatically provisioning a mimic host with the session encryption key of an end-to-end encryption communication session with the attacker host, thus redirecting the traffic from a victim host to the mimic host without disrupting the communication from the perspective of the attacker host. From the security perspective, an important advantage of this solution is that the attacker host cannot detect the corrective action and change its behavior when it is observed.

Exemplary embodiments of the present disclosure are described largely in the context of a fully functional computer system for shared memory workloads using existing network fabrics. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of covert monitoring of an attacker host in a software defined perimeter ('SDP') network, the method comprising:
   authenticating, by an SDP controller, a first and second host in the SDP network, wherein the first and second host, after authentication, establish an end-to-end encryption communication session;
   detecting, by the SDP controller, that the first host is an attacker host and the second host is a victim host;
   establishing, by the SDP controller as a copy of the victim host, a mimic host; and
   redirecting, by the SDP controller, communication from the attacker host to the mimic host comprising migrating, without disruption detectable by the attacker host, the communication session from the victim host to the mimic host, wherein the mimic host monitors communications with the attacker host.

2. The method of claim 1, further comprising receiving, by the SDP controller from the second host, a key utilized by the second host to communicate with the first host via the communication session.

3. The method of claim 2, wherein:
   establishing the mimic host further comprises provisioning the mimic host with the key.

4. The method of claim 3, wherein:
   migrating the communication session further comprises updating connection information describing the communication session to reflect a connection between the attacker host and the mimic host rather than the attacker host and the victim host.

5. The method of claim 1, wherein each of the hosts comprises a virtual machine.

6. The method of claim 1, wherein each of the hosts comprises a container.

7. The method of claim 1, wherein the SDP network comprises a cloud computing environment.

8. The method of claim 7, wherein the cloud computing environment is a private cloud computing environment.

9. The method of claim 7, wherein the cloud computing environment is a public cloud computing environment.

10. The method of claim 7, wherein the cloud computing environment is a hybrid cloud computing environment.

11. An apparatus for covert monitoring of an attacker host in a software defined perimeter ('SDP') network, the apparatus comprising a computer processor, a computer memory operatively coupled to the computer processor, the computer memory having disposed within it computer program instructions that, when executed by the computer processor, cause the apparatus to carry out the steps of:
    authenticating, by an SDP controller, a first and second host in the SDP network, wherein the first and second host, after authentication, establish an end-to-end encryption communication session;
    detecting, by the SDP controller, that the first host is an attacker host and the second host is a victim host;
    establishing, by the SDP controller as a copy of the victim host, a mimic host; and
    redirecting, by the SDP controller, communication from the attacker host to the mimic host comprising migrating, without disruption detectable by the attacker host, the communication session from the victim host to the mimic host, wherein the mimic host monitors communications with the attacker host.

12. The apparatus of claim 11, further comprising computer program instructions that, when executed by the computer processor, cause the apparatus to carry out the step of receiving, by the SDP controller from the second host, a key utilized by the second host to communicate with the first host via the communication session.

13. The apparatus of claim 12, wherein:
    establishing the mimic host further comprises provisioning the mimic host with the key.

14. The apparatus of claim 13, wherein:
    migrating the communication session further comprises updating connection information describing the communication session to reflect a connection between the attacker host and the mimic host rather than the attacker host and the victim host.

15. The apparatus of claim 11, wherein each of the hosts consists of one of:
    a virtual machine and a container.

16. The apparatus of claim 11, wherein the SDP network comprises a cloud computing environment.

17. A computer program product for covert monitoring of an attacker host in a software defined perimeter ('SDP') network, the computer program product disposed upon a computer readable medium, the computer program product comprising computer program instructions that, when executed, cause a computer to carry out the steps of:
    authenticating, by an SDP controller, a first and second host in the SDP network, wherein the first and second host, after authentication, establish an end-to-end encryption communication session;

detecting, by the SDP controller, that the first host is an attacker host and the second host is a victim host;

establishing, by the SDP controller as a copy of the victim host, a mimic host; and redirecting, by the SDP controller, communication from the attacker host to the mimic host comprising migrating, without disruption detectable by the attacker host, the communication session from the victim host to the mimic host, wherein the mimic host monitors communications with the attacker host.

18. The computer program product of claim 17, further comprising computer program instructions that, when executed, cause the computer to carry out the step of receiving, by the SDP controller from the second host, a key utilized by the second host to communicate with the first host via the communication session.

19. The computer program product of claim 18, wherein: establishing the mimic host further comprises provisioning the mimic host with the key.

20. The computer program product of claim 19, wherein: migrating the communication session further comprises updating connection information describing the communication session to reflect a connection between the attacker host and the mimic host rather than the attacker host and the victim host.

* * * * *